UNITED STATES PATENT OFFICE.

CHRISTOPHER RIS, OF BASEL, SWITZERLAND.

BLUE SULFUR DYE AND PROCESS OF MAKING SAME.

No. 821,378.     Specification of Letters Patent.     Patented May 22, 1906.

Application filed October 28, 1905. Serial No. 284,827. (Specimens.)

*To all whom it may concern:*

Be it known that I, CHRISTOPHER RIS, a citizen of the Swiss Confederation, residing at Basel, Switzerland, have invented certain new and useful Violet to Blue Sulfur Dyestuffs from Indophenols and Processes for Obtaining the Same, of which the following is a specification.

In the specification of German Patent No. 132,212, which deals with the conversion of indophenols into sulfur dyestuffs, the following remark is made after enumerating the substances suitable for the reaction: "On the other hand, all indophenol derivatives which do not contain at least one phenol radical belonging to the benzene series are not suitable." From this it must be assumed that the known indophenols which are derived from alpha-naphthol and para-diamins, of which that one from dimethyl-para-phenylene-diamin has been put upon the market as vat blue, have proved to be incapable of reaction. An analogous observation is contained in the French Patent No. 284,387, and also the general formula, together with the respective explanations which are in that patent, give a clear indication in regard to the inventor's opinion that indophenols from para-diamins and alpha-naphthol would be incapable of undergoing reaction. Therefore these well-known and easily-obtainable indophenols of the general formula

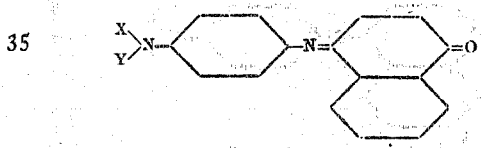

have not yet found any use in the manufacture of sulfur dyestuffs. New researches in this series of coloring-matters have now shown in a very unexpected manner that, on the contrary, these indophenols derived from para-diamins and alpha-naphthol or their leuco derivatives may easily be transformed into new and valuable sulfur dyestuffs by treating them with alkali polysulfids at a high temperature.

The respective leuco-indophenols themselves in alkali-sulfid solution show scarcely any affinity at all for unmordanted cotton. If attempts be made to dye it, as commonly practiced with sulfur dyestuffs, scarcely any leuco-indophenol becomes fixed. On washing with water almost all of it is removed, and by subsequent oxidation on the fiber only very weak unsightly shades are produced. To dye with indophenol the cotton must rather, as is well known, be impregnated with the leuco-indophenol in a comparatively strong vat and the former then, without previous washing, oxidized. Respecting these indophenol dyes, Möhlau, in *Organische Farbstoffe*, page 181, writes as follows: "If such experiments have yielded an unsatisfactory result, the reason therefor most likely lies in the fact that the affinity of the leuco-indophenol for the fiber is less than that for the alkali, in combination with which it is dissolved in the vat." In order to obtain better results, attempts were then made to dye indophenol together with indigo in the vat, it being intended to fix the leuco-indophenol by the aid of the indigo white. In contradistinction to this the new sulfurized indophenol dyestuffs have a very strong affinity for cotton fiber, which is dyed in very full shades in the manner usual for sulfur dyestuffs. The leuco bodies adhere firmly to the fiber and are not removed by washing. The dyestuffs are developed by subsequent oxidation after well-known methods. If the derivatives of the simple para-diamins are started with, dark-violet dyestuffs are obtained, whereas, on the other hand, beautiful blue tones of various shadings are obtained if alkylated para-diamins are employed. All these colors are very fast to light, washing, and alkalies. Toward acids they behave similarly to the indophenols themselves, inasmuch as they are attacked by mineral acids. Dilute organic acids, however, do not alter the dyestuffs. The dyestuffs all dissolve in sodium-sulfid solution with a clear greenish color. In alcohol as well as in benzene they dissolve with a blue color. Concentrated sulfuric acid gives brownish-colored solutions with decomposition. With reducing agents, such as zinc-dust and hydrochloric acid, evolution of sulfureted hydrogen takes place.

Example: A press-paste containing twenty kilograms of the indophenol from para-amido-dimethylanilin plus alpha-naphthol is stirred up with thirty kilograms of crystallized sodium sulfid, a clear solution being formed in a short time. This is added to a solution of fifteen kilograms of sulfur in forty kilograms of fused crystallized sodium sulfid and the solution evaporated to the boiling-point of 115° centigrade. At this stage the leuco-indophenol separates as an oil and remains separated throughout the whole time of the reaction, but reacts, however, none the less easily and quietly with a strong evolution of sulfureted hydrogen. It is kept boiling for about eight hours under a reflux condenser, for which purpose a boiler with a stirring apparatus may serve for the operation. It is then allowed to cool and the solidified dyestuff cake separated from the mother-liquor, which contains only traces of dyestuff. The dyestuff is then dissolved in about six hundred liters of hot water with the aid of twenty kilograms of sodium sulfid. From the greenish solution produced it may be precipitated either by oxidation—as, for example, by a current of air—or separated as the leuco compound—best with sodium bicarbonate. The product is filtered off and dried. In this case the leuco body becomes colored dark blue on access of air and assumes a bronze luster. The dyestuff produces on unmordanted cotton prominently beautiful blue tones of the above-stated properties.

If in the above example the diethylated indophenol be employed, a greener blue is produced; from para-amido-mono-methyl-ortho-toluidin and alpha-naphthol, a redder one, and with the corresponding mono-ethyl bodies a blue similar in shade to the dimethylanilin derivatives. The indophenols from para-phenylenediamin or para-toluylene-diamin $(CH_3:NH:NH_2:=1:2:5)$ yield dyestuffs which even with three per cent. produce deep dark-violet tones. Indophenols from other para-diamins may also be used—thus, for example, from para-amido-methylbenzylanilin, para-amido-diphenylamin, also thiosulfonic acids (for example, from para-amido-dimethylanilin-thiosulfonic acid and alpha-naphthol) or carboxylic acids, (from alpha-naphthol-carboxylic acid.)

The conditions of the reaction may obviously be modified in various ways. Thus other relative proportions or quantities may be adopted. Alkali-lye may serve for the preparation of the polysulfids. The temperature may either be kept lower (in which case the reaction will be correspondingly retarded) or higher, in which case if it be materially exceeded—e. g., up to 140° to 160° centigrade—no more specially-favorable result is obtained. The process may be also carried out in closed apparatus and in this case the unevaporated solution obtained according to the above example employed. Finally, additions to the melt, such as glycerin, may be used or another solvent may be employed instead of water—e. g., alcohol. Even when boiled on a waterbath reaction takes place, being indicated by the evolution of sulfureted hydrogen, although only slow, but which is accelerated at a higher temperature in autoclaves.

What I claim is—

1. The process of manufacturing violet to blue sulfur dyes by treating the indophenols from para-diamins and alpha-naphthol in form of their leuco compounds with alkali-polysulfids at a high temperature, substantially as described.

2. The manufacture of a blue sulfur dye by heating the indophenol from dimethyl-para-phenylenediamin and alpha-naphthol in form of their leuco compounds with alkali-polysulfids.

3. The new blue sulfur dyestuff obtainable from the indophenol from dimethyl-para-phenylenediamin and alpha-naphthol, substantially as described, which forms a dark-blue powder, insoluble in water, soluble in alcohol or benzene with blue color, soluble in sodium-sulfid solution with a clear greenish color, soluble in concentrated sulfuric acid with brownish color, while undergoing decomposition, and dyeing on unmordanted cotton beautiful blue shades.

In witness whereof I have hereunto set my hand in presence of two subscribing witnesses.

CHRISTOPHER RIS.

Witnesses:
GEORGE GIFFORD,
ALBERT GRAETER.